United States Patent [19]

Kellner

[11] Patent Number: 5,598,268
[45] Date of Patent: Jan. 28, 1997

[54] PROCESS FOR DETERMINING THE LOCATION OF A POSITIONING BODY IN RELATION TO A REFERENCE BODY AND DEVICE FOR IMPLEMENTING THE PROCESS

[75] Inventor: Helmut Kellner, Moormerland-Veenh, Germany

[73] Assignee: E.M.S. Technik GmbH, Leer, Germany

[21] Appl. No.: 374,574

[22] PCT Filed: Jul. 14, 1993

[86] PCT No.: PCT/DE93/00628

§ 371 Date: Mar. 3, 1995

§ 102(e) Date: Mar. 3, 1995

[87] PCT Pub. No.: WO94/03775

PCT Pub. Date: Feb. 17, 1994

[30] Foreign Application Priority Data

Jul. 31, 1992 [DE] Germany ............ 42 25 270.9

[51] Int. Cl.[6] ........................... G01B 11/00
[52] U.S. Cl. ................. 356/375; 356/373; 33/707
[58] Field of Search ................. 356/375, 373, 356/374, 399; 33/707; 250/237 G

[56] References Cited

U.S. PATENT DOCUMENTS 5,017,013   5/1991   Kellner.
5,317,388   5/1994   Surka et al. ................. 356/375
5,404,226   4/1995   Kellner.
5,456,020   10/1995  Kellner ..................... 33/707

FOREIGN PATENT DOCUMENTS 0390725   10/1990   European Pat. Off..
3909856   11/1991   Germany.
4104602   6/1992    Germany.

OTHER PUBLICATIONS

"Photogrammetrie", Gottfried Konecny and Gerhard Lehmann, 4th edition, de Gruyter, Berlin–New York, 1984, pp. 48–55.

Primary Examiner—Hoa Q. Pham
Attorney, Agent, or Firm—Burns, Doane, Swecker & Mathis, L.L.P.

[57] ABSTRACT

The description relates to a process for determining the location of a positioning body in relation to a reference body and a device for implementing it. The positioning body (10) bears a scale with evenly spaced markings and the reference body comprises a scanner (12) with a projection surface on which the mark (16) of the scale are projected and imaging optics. The coordinates of the center of projection of the imaging optics are calculated by evaluating the mark (16) arranged on the scale. Here, coded marks of two perpendicular surface scales of the scale or the positioning body are decoded and at least four centers of intersection regions of the marks of both surface scales confining an area are determined. The calculation is made via the protective relationship between the projection surface of the scanner and the plane of the scale bearing the marks.

20 Claims, 3 Drawing Sheets

PROCESS FOR DETERMINING THE LOCATION OF A POSITIONING BODY IN RELATION TO A REFERENCE BODY AND DEVICE FOR IMPLEMENTING THE PROCESS

BACKGROUND OF THE INVENTION

1) Field of the Invention The invention relates to a process for determining the location of a positioning body in relation to a reference body 1 and a device for implementing the process.

2) Discussion of Related Art Such a process serves, e.g. to measure the distance between longitudinally moveable objects, like automatic measuring heads, gripping arms or assembly arms, during the control sequence of measuring and production machines. In so doing, the accuracy with which these distances can be determined is a decisive factor for the production accuracy of the automatic machines.

A process that enables high accuracy of measurement independently of an exact guide for the scanner is already known from the DE-OS 39 09 856. Here, three marks of a scale are evaluated by a scanner. With two marks, an angle of projection formed between a center of projection and these marks would still depend on the distance that the center of projection is above the marks and how far it is offset laterally. With three marks, however the center of projection can be determined exactly via the other angle of projection between the center of projection, the other mark and one of the other marks. For a combination of two combined angles there exists only one single place, at which the center of projection can be located.

In addition, it is known from the DE-PS 41 04 602 U.S. Pat. No. 5,401,226) to calculate the coordinates of the center of projection of an imaging lens from the known coordinates of marks on the scale via the projecting relationship between the projection surface of the scanner and the plane of the scale. The marks obtain their coordinate information with respect to the scale in coded form. The coordinate information is decoded during the calculation.

Furthermore, it is known from the book by G. Konecny and G. Lehmann: Photogrammetry, 4th edition, de Gruyter, Berlin—New York, 1984, pp. 48–55, to utilize a projecting relationship in order to determine the coordinates and to take into consideration an angle of tilt between a projection surface and the plane of the original image. To produce the projectivity between two planes, four known points are used.

SUMMARY OF THE INVENTION

The invention is based on the problem of determining all of the parameters of the location of a positioning body with respect to a reference body with one single scanner.

In the invention the marks contain the absolute information of their coordinates on the scale in coded form. The coding is put into practice as different line thicknesses. The centers of the intersection regions of the marks correspond exactly to the locations described by the coding.

A relation between the coordinates on the positioning body, thus the plane of the scale bearing the marks and the projection surface of the scanner, exits via the projecting relationship. The relation can be described by means of equations of the collinear transformation, whose general formula reads:

$$X = \frac{a1 * X' + a2 * Y' + a3}{c1 * X' + c2 * Y' + 1}$$

$$Y = \frac{b1 * X' + b2 * Y' + b3}{c1 * X' + c2 * Y' + 1}$$

They are two equations with 8 unknowns. If four centers are selected, eight equations can be set up and the eight unknowns can be determined by this method. In this manner, it is possible to state all of the parameters for determining the spatial location of a positioning body relative to a reference body (six degrees of freedom).

The exact calculation can be done with the formulas, appearing below which are already resolved for the coordinates of the center of projection and the angle of orientation between the projection surface of the scanner and the plane of the scale.

An improvement provides that more than four centers are determined by the intersection regions of the marks on the surface scales and that a balancing calculation be done.

For more than four centers there is agreement. If these other centers are used in the calculation, the results of the measurement can be improved by the balancing calculation. In this manner the inaccuracies in the mechanical design of the marks and the scanner, optical errors and rounding off errors can be reduced in the calculation.

Furthermore, it is provided that finally the intersection regions of the marks are reproduced on the scanner.

With this measure a better contrast can be obtained when evaluating the differences in brightness in the direction of the lines and the columns of the pixel field of a scanner. In addition, the intersection regions are defined exactly with respect to the surroundings, thus simplifying the calculation of the centers.

During the evaluation, the intersection regions of the marks can be evaluated separately according to the direction of the coordinates by determining, according to the process of edge division, the absolute frequency of the brightness values of the intersection regions of the marks in the direction of the columns and lines of the light-sensitive pixels of the scanner and by comparing the brightness values with a threshold value. The frequencies above the threshold value are then evaluated as the coordinates occupied by the marks.

The process makes it possible to produce through simple summation of the brightnesses of the pixel field by lines or by columns a signal that represents a function of the location of the marks. By inserting a threshold value parasitic signals and softened outlines, which occur when the marks are not parallel with respect to the orientation of the lines and the columns of the pixel field, can be reduced.

Furthermore, it is provided that the centers of the intersection regions of the marks are obtained by forming an average value in both coordinate directions, by designing the respective pixel fields of the scanner as search fields and by determining in each search field the coordinates of the center XS and YS according to equations of the center.

$$Xs = \frac{1}{NLok} * \sum_{i=1}^{NLok} Xi$$

$$Ys = \frac{1}{NLok} * \sum_{i=1}^{NLok} Yi$$

This procedure also yields the center, even if the marks exhibit an irregular shape owing to mechanical or optical influences.

Improvements and advantageous designs of the process and device follow from the description and the drawings, with the aid of which the invention is described in detail.

DETAILED DESCRIPTION OF THE PREFERRED EMBODIMENTS

Figure 1:
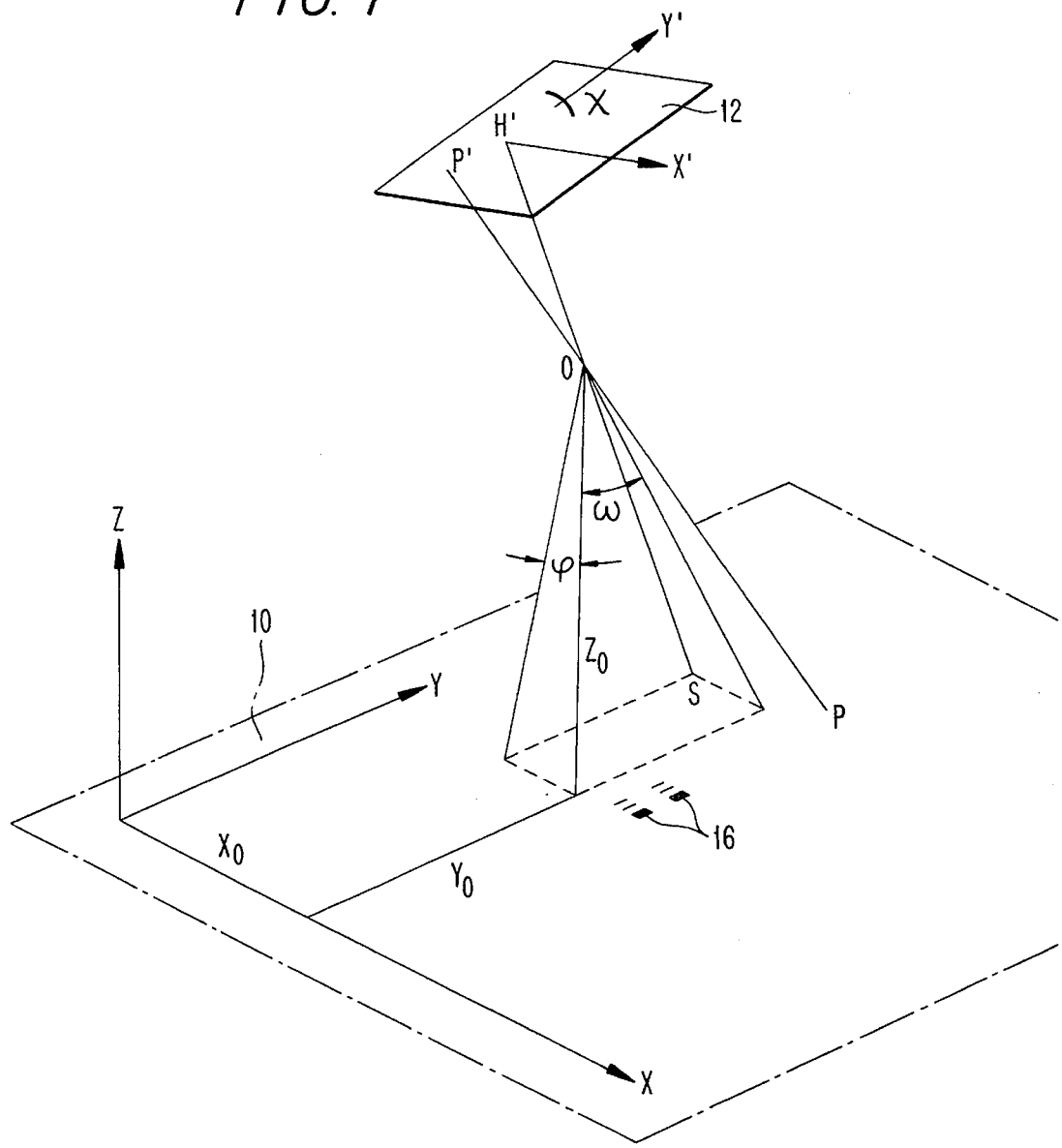
FIG. 1 is a schematic perspective view of a positioning body in relation to a reference body with a scanner.

FIG. 1 is a schematic perspective view of a positioning body with a plane 10 exhibiting a scale, in relation to a reference body with a scanner 12. The scanner 12 is provided with an imaging lens, whose center of projection is at point 0. The imaging lens is shown in phantom for the sake of straightforwardness, since only the location of the center of projection 0 is important for the information about the parameters.

The location parameters, which describe the location of the positioning body in relation to the reference body, are given, first of all, by the coordinates X0, Y0, and Z0. The location is also determined by the angles of orientation $\kappa$, $\phi$, $\omega$ between the projection surface of the scanner 12 and the plane 10 of the scale. In so doing, $\kappa$ is the angle of orientation relative to the Z axis; $\phi$ is the angle of orientation relative to the X axis; and $\omega$, the angle of orientation relative to the Y axis. In FIG. 1 these angles are based on an auxiliary line, which runs from a vertical base point H' of the projection surface through the center of projection O to a projected point S on the plane 10 of the positioning body.

According to the equations of the collinear transformation that describe the projecting relationship between a base plane and an image plane, eight equations are to be solved with eight unknowns. To this end, the reproduced coordinates of four points of the positioning body are evaluated. For the sake of straightforwardness, only one point P is shown in FIG. 1 on the plane 10 of the positioning body; this point being reproduced as point P' on the projection surface of the scanner 12.

If the coordinates of these points are known, they can be put into the following listed equations, which are already solved for XO, YO, ZO and for $\kappa$, $\phi$ and $\omega$.

$$XO = a3 - ZO * \left( \frac{\tan(\delta)}{c} * \sin(v) \right)$$

$$YO = b3 - ZO * \left( \frac{\tan(\delta)}{c} * \cos(v) \right)$$

$$ZO = \frac{\left( \frac{a1}{c1} - \frac{a2}{c2} \right)}{\left( \frac{k2}{c1} - \frac{k5}{c2} \right) * \cos(v) + \left( \frac{k3}{c1} - \frac{k6}{c2} \right) * \sin(v)}$$

$$K = \arctan\left( \frac{c1}{c2} \right)$$

$$\phi = \arctan\left( \frac{ZO * \tan(\delta) * \sin(v)}{ZO} \right)$$

$$\omega = \arctan\left( \frac{ZO * \tan(\delta) * \cos(v)}{ZO} \right)$$

with $$\delta = \arctan\left( -\frac{(c1 + c2) * c}{\sin(K) + \cos(K)} \right)$$

$$v = \arctan\left( \frac{k5 * k7 - k2}{k1 + k2 - k7 * (k4 + k6)} \right)$$

$$k1 = c1 * \frac{\tan(\delta)}{c}$$

$$k2 = \frac{\cos(K)}{c * \cos(\delta)}$$

$$k3 = \frac{\sin(K)}{c}$$

$$k4 = c2 * \frac{\tan(\delta)}{c}$$

$$k5 = -\frac{\sin(K)}{c * \cos(\delta)}$$

$$k6 = \frac{\cos(K)}{c}$$

$$k7 = \frac{c1 * a3 - a1}{c2 * a3 - a2}$$

$\kappa$ is denotes the angle of orientation relative to the Z axis; $\phi$ denotes the angle of orientation relative to the Y axis; $\omega$, the angle of orientation relative to the X axis; c, the chamber constant in accordance with the distance between the center of projection O and the vertical base point H' of the reference body sandy represent the transformation variables; and a1, a2, a3, b3, c1, c2 represent the transformation constants.

This measure is implemented in a computer 17, which decodes first the coded coordinates of the points to be evaluated, then determines the centers of the marks and executes the computing steps in order to obtain the location parameters. The computer can also be controlled in such a manner that it evaluates more than four points while computing. Then it is possible to obtain a higher accuracy by means of the balancing computation according to 9 Gaussian curve.

The positioning body comprises a scale with marks 16, whose centers Xs, Ys are arranged at constant intervals. The marks 16 have different line thicknesses, with which their coordinates are coded. The decoding of the line thickness of several codes containing adjacent marks makes it possible to give the absolute coordinates of the marks 16 on the surface scale. Since marks 16 are affixed one above the other, thus orthogonally, on the surface scale in both coordinate directions, the code yields the surface coordinates.

In the case of preferred scales the marks 16 are not drawn all the way in the respective transverse direction of the coordinates, but rather only the intersection regions of the marks 16 of the different coordinate directions are illustrated. Thus, the result is a pattern comprising the oblongs of the different side lengths.

Figure 2:
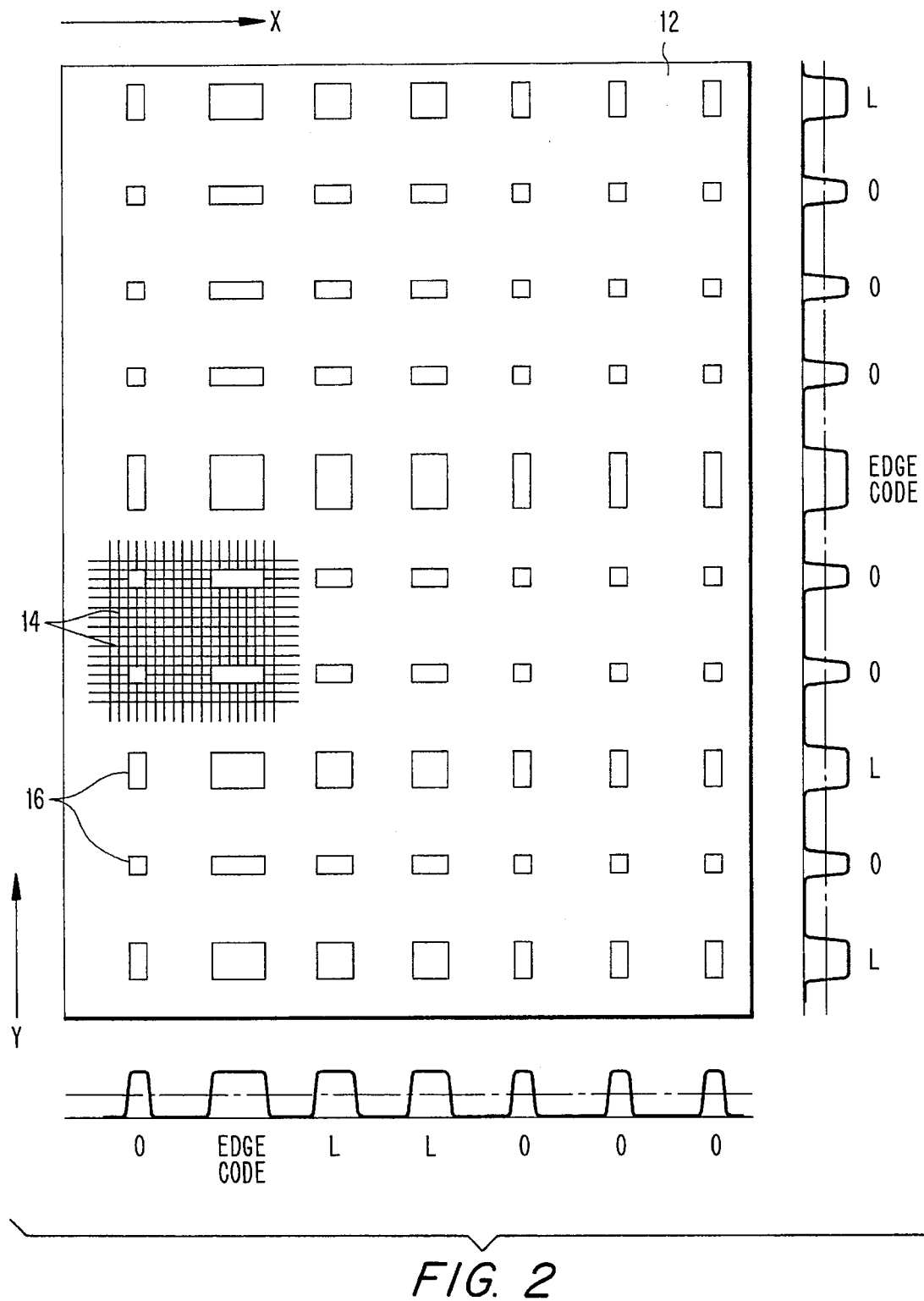
FIG. 2 is a top view of a scanner with reproduced marks to illustrate the process of edge division and FIG. 3 is an enlarged top view of a scanner to illustrate how the center is determined.

FIG. 2 is a drawing of the projection surfaces of the scanner 12, where the pixels 14 are arranged in the direction of columns and lines. The reproduced marks 16 occupy here several pixels 14. The marks 16 are evaluated according to the process of edge division. To determine the frequency, at which marks 16 are reproduced on the pixels 14, the brightnesses of all of the pixels 14 lying in one column are added together for the X direction, thus the direction of the column. This is done by line-by-line integration. The frequencies in the Y direction, thus in the direction of the line, is determined analogously by summing the brightnesses for each line of pixels, thus the integration of the brightnesses in the column direction.

Signals, which illustrate the edge division of the absolute frequencies, are plotted on two sides of the scanner 12. If a threshold value is determined, the signals lying above the threshold value, can be unequivocally assigned to the marks 16, which lie in the respective coordinate direction. The coded coordinates of the marks 16 can be decoded from the local width of the signals in combination with the signals, which are produced by means of the adjacent marks 16. Thus, it is possible to state the absolute location of each individual mark 16 on the plane 10 of the positioning body, even though only one portion of this plane 10 is reproduced on the scanner 12 of the reference body.

Figure 3:
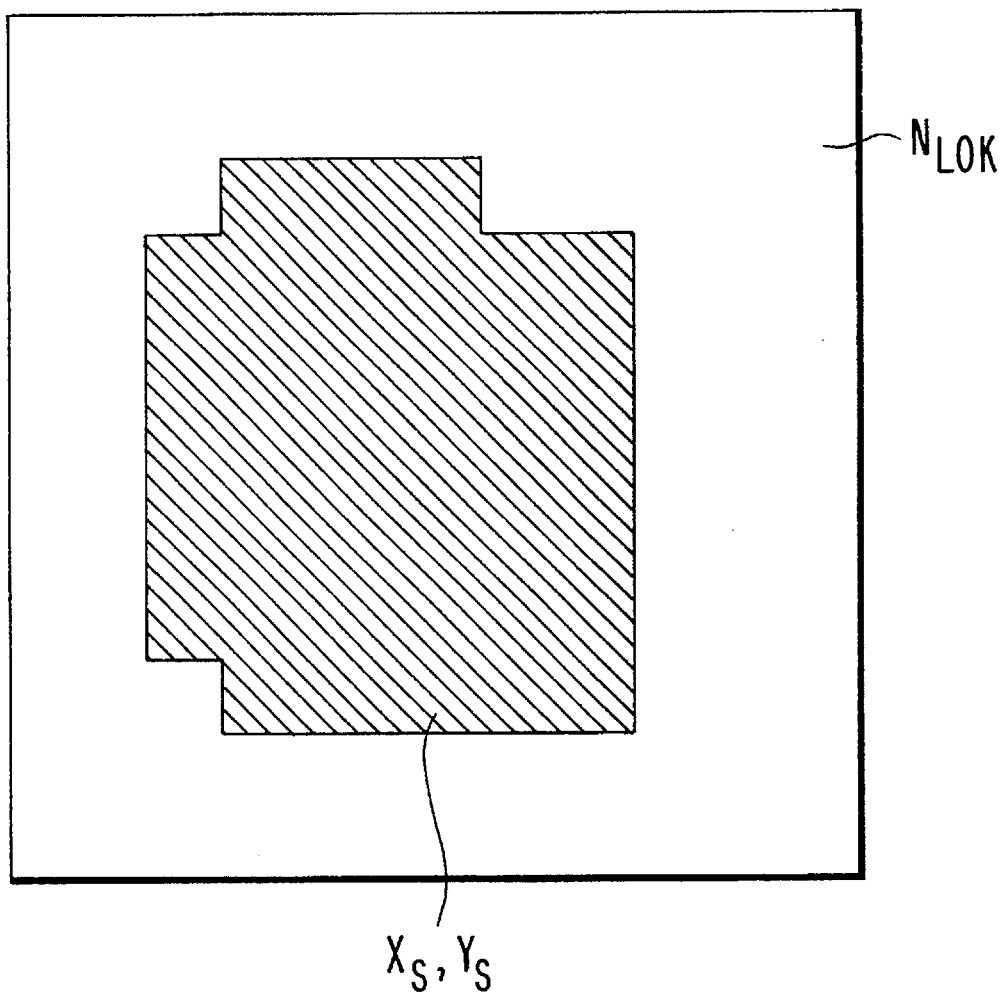

Since the marks 16 have a finite expansion, in order to store coded information by means of the different widths, the area occupied on the projection plane is so large that several pixels are occupied. Thus, it is not possible to use the coordinates of one of the pixels as the imaging coordinates. Rather the center is formed through computation, which is explained with reference to FIG. 3. This figure is an enlarged detail of the projection surface. Illustrated is a search region, which comprises several pixels. A mark 16 is reproduced on one spot of this search region. The center of this mark 16 is determined now according to the following formulas by forming an average.

$$Xs = \frac{1}{NLok} * \sum_{i=1}^{NLok} Xi$$

$$Ys = \frac{1}{NLok} * \sum_{i=1}^{NLok} Yi$$

In this manner the exact information about the coordinates of the centers of the marks 16 is obtained. By putting now into the equations the coordinates of the reproduced points and the coordinates obtained by decoding the marks 16, the coordinates of the center of projection O and the angle of orientation can be calculated.

The invention has been described using exemplary embodiments to which the present invention is not limited. The metes and bounds of the invention are to be determined with reference to the appended claims.

What is claimed is:

1. A process for determining a location of a positioning body in relation to a reference body, said process comprising the steps of:

providing on a positioning body a scale with marks of known coordinates in a plane;

providing a scanner on the reference body, the scanner including a projection surface, on which the marks of a scale are projected, and an imaging lens;

calculating coordinates of a center of projection of the imaging lens from the known coordinates of the marks on the scale via a projecting relationship between the projection surface of the scanner and the plane of the scale, whereby the marks provide their coordinate information with respect to the scale in coded form and are decoded for the calculation, wherein the scale comprises two orthogonal surface scales;

wherein the marks of both surface scales form intersection regions; and wherein the calculation is based on at least four centers of intersection regions of the marks of both surface scales defining an area as the known coordinates of the marks.

2. A process as claimed in claim 1, wherein the calculating step calculates the coordinates based on more than four centers of the intersection regions of the marks of both surface scales and further comprises the step of performing a balancing calculation according to a Gaussian curve.

3. A process as claimed in claim 2, wherein the intersection regions of the marks are reproduced exclusively on the scanner.

4. A process as claimed in claim 3, wherein the calculating step includes evaluating the intersection regions of the marks separately according to a direction of the coordinates by determining according to a process of edge division an absolute frequency of brightness values of the intersection regions of the marks in directions of columns and lines of light-sensitive pixels of the scanner and by comparing with a threshold value; wherein absolute values above the threshold value are determined to be coordinates occupied by the marks.

5. A process as claimed in claim 3, further comprising the step of determining centers of the intersection regions of the marks by forming an average value in both coordinate directions, by selecting the respective pixel fields of the scanner as search fields and by determining in each search field the coordinates of the center XS and YS according to the following equations:

$$Xs = \frac{1}{NLok} * \sum_{i=1}^{NLok} Xi$$

$$Ys = \frac{1}{NLok} * \sum_{i=1}^{NLok} Yi$$

where NLok are the number of points in the pixel field.

6. A process as claimed in claim 1, wherein the intersection region of the marks are reproduced exclusively on the scanner.

7. A process as claimed in claim 6, wherein the calculating step includes evaluating the intersection regions of the marks separately according to a direction of the coordinates by determining according to a process of edge division an absolute frequency of brightness values of the intersection regions of the marks in directions of columns and lines of light-sensitive pixels of the scanner and by comparing with a threshold value; wherein absolute values above the threshold value are determined to be coordinates occupied by the marks.

8. A process as claimed in claim 7, further comprising the step of determining centers of the intersection regions of the marks by forming an average value in both coordinate directions, by selecting the respective pixel fields of the scanner as search fields and by determining in each search field the coordinates of the center XS and YS according to the following equations:

$$Xs = \frac{1}{NLok} * \sum_{i=1}^{NLok} Xi$$

$$Ys = \frac{1}{NLok} * \sum_{i=1}^{NLok} Yi$$

where NLok are the number of points in the pixel field.

9. A process as claimed in claim 6, further comprising the step of determining centers of the intersection regions of the marks by forming an average value in both coordinate directions, by selecting the respective pixel fields of the scanner as search fields and by determining in each search field the coordinates of the center XS and YS according to the following equations:

$$Xs = \frac{1}{NLok} * \sum_{i=1}^{NLok} Xi$$

$$Ys = \frac{1}{NLok} * \sum_{i=1}^{NLok} Yi$$

where NLok are the number of points in the pixel field.

10. A process for determining a location of a positioning body in relation to a reference body, said process comprising the steps of:

provinding on a the positioning body a scale with marks of known coordinates in a plane;

providing a scanner on the reference body, the scanner including a projection surface, on which the marks of a scale are projected, and an imaging lens;

calculating coordinates of a center of projection of the imaging lens from the known coordinates of the marks on the scale via a projecting relationship between the projection surface of the scanner and the plane of the scale, where by the marks provide their coordinate information with respect to the scale in coded form and are decoded for the calculation, wherein the scale comprises two orthogonal surface scales; wherein the marks of both surface scales form intersection regions; wherein the calculation is based on at least four centers of intersection regions of the marks of both surface scales defining an area as the known coordinates of the marks; and wherein said calculating step includes calculating in three dimensions coordinates XO, YO, ZO of the center of projection and angles of orientation K, $\phi$, $\omega$ between the projection surface of the scanner and the plane of the scale are calculated according to the following functions and equations:

$$XO = a3 - ZO * \left( \frac{\tan(\delta)}{c} * \sin(v) \right)$$

$$YO = b3 - ZO * \left( \frac{\tan(\delta)}{c} * \cos(v) \right)$$

$$ZO = \frac{\left( \frac{a1}{c1} - \frac{a2}{c2} \right)}{\left( \frac{k2}{c1} - \frac{k5}{c2} \right) * \cos(v) + \left( \frac{k3}{c1} - \frac{k6}{c2} \right) * \sin(v)}$$

$$K = \arctan\left( \frac{c1}{c2} \right)$$

$$\phi = \arctan\left( \frac{ZO * \tan(\delta) * \sin(v)}{ZO} \right)$$

$$\omega = \arctan\left( \frac{ZO * \tan(\delta) * \cos(v)}{ZO} \right)$$

with $$\delta = \arctan\left( -\frac{(c1 + c2) * c}{\sin(K) + \cos(K)} \right)$$

$$v = \arctan\left( \frac{k5 * k7 - k2}{k1 + k2 - k7 * (k4 + k6)} \right)$$

$$k1 = c1 * \frac{\tan(\delta)}{c}$$

$$k2 = \frac{\cos(K)}{c * \cos(\delta)}$$

$$k3 = \frac{\sin(K)}{c}$$

$$k4 = c2 * \frac{\tan(\delta)}{c}$$

$$k5 = -\frac{\sin(K)}{c * \cos(\delta)}$$

$$k6 = \frac{\cos(K)}{c}$$

$$k7 = \frac{c1 * a3 - a1}{c2 * a3 - a2}$$

where K denotes an angle of orientation relative to the Z axis; $\phi$ denotes an angle of orientation relative to the Y axis; $\omega$ denotes an angle of orientation relative to the X axis; c denotes a chamber constant in accordance with the distance between the center of projection O and the vertical base point H' of the reference body; $\delta$ and $\gamma$ denote transformation variables; and a1, a2, a3, b3, c1, c2 represent the transformation constants.

11. A process as claimed in claim 10, wherein the calculating step calculates the coordinates based on more than four centers of the intersection regions of the marks of both surface scales and further comprises the step of performing a balancing calculation according to a Gaussian curve.

12. A process as claimed in claim 11, wherein the intersection regions of the marks are reproduced exclusively on the scanner.

13. A process as claimed in claim 12, wherein the calculating step includes evaluating the intersection regions of the marks separately according to a direction of the coordinates by determining according to a process of edge division an absolute frequency of brightness values of the intersection regions of the marks in directions of columns and lines of light-sensitive pixels of the scanner and by comparing with a threshold value; wherein absolute values above the threshold value are determined to be coordinates occupied by the marks.

14. A process as claimed in claim 12, further comprising the step of determining centers of the intersection regions of the marks by forming an average value in both coordinate directions, by selecting the respective pixel fields of the scanner as search fields and by determining in each search field the coordinates of the center XS and YS according to the following equations:

$$Xs = \frac{1}{NLok} * \sum_{i=1}^{NLok} Xi$$

$$Ys = \frac{1}{NLok} * \sum_{i=1}^{NLok} Yi$$

where NLok are the number of points in the pixel field.

15. A process as claimed in claim 10, wherein the intersection regions of the marks are reproduced exclusively on the scanner.

16. A process as claimed in claim 15, wherein the calculating step includes evaluating the intersection regions of the marks separately according to a direction of the coordinates by determining according to a process of edge division an absolute frequency of brightness values of the intersection regions of the marks in directions of columns and lines of light-sensitive pixels of the scanner and by comparing with a threshold value; wherein absolute values above the threshold value are determined to be coordinates occupied by the marks.

17. A process as claimed in claim 16, further comprising the step of determining centers of the intersection regions of the marks by forming an average value in both coordinate directions, by selecting the respective pixel fields of the scanner as search fields and by determining in each search field the coordinates of the center XS and YS according to the following equations:

$$X_s = \frac{1}{NLok} * \sum_{i=1}^{NLok} X_i$$

$$Y_s = \frac{1}{NLok} * \sum_{i=1}^{NLok} Y_i$$

where NLok are the number of points in the pixel field.

18. A process as claimed in claim 15, further comprising the step of determining centers of the intersection regions of the marks by forming an average value in both coordinate directions, by selecting the respective pixel fields of the scanner as search fields and by determining in each search field the coordinates of the center XS and YS according to the following equations:

$$X_s = \frac{1}{NLok} * \sum_{i=1}^{NLok} X_i$$

$$Y_s = \frac{1}{NLok} * \sum_{i=1}^{NLok} Y_i$$

where NLok are the number of points in the pixel field.

19. A device for determining the location of a positioning body in relation to a reference body, comprising:

a positioning body bearing a scale including two orthogonal surface scales with marks of known coordinates on a plane on which the marks of both surface scales form intersection regions;

a reference body including a scanner with a projection surface, on which the marks of the scale are projected, and an imaging lens; and a computer calculating coordinates of a center of projection of the imaging lens from the known coordinates of the marks on the scale via a projecting relationship between the projection surface of the scanner and the plane of the scale, whereby the marks provide their coordinate information with respect to the scale in coded form and are decoded for the calculation, and wherein of respective intersection regions of the marks of both surface scales defining an area as the known coordinates of the marks.

20. A device as claimed in claim 19, wherein the intersection regions of the marks of both surface are present exclusively on the plane of the scale bearing the marks.

* * * * *